United States Patent
Appalla et al.

(10) Patent No.: US 8,817,782 B2
(45) Date of Patent: Aug. 26, 2014

(54) METHOD TO ROUTE MULTICAST DATA IN SPB NETWORK BY ESTABLISHING THE VIRTUAL PIM ADJACENCY ACROSS THE SPB NETWORKS IN A SINGLE PIM DOMAIN

(75) Inventors: Rama S. Appalla, Nashua, NH (US); Gautam Khera, Walpole, MA (US); Julie McGray, North Andover, MA (US)

(73) Assignee: Avaya Inc., Basking Ridge, NJ (US)

( * ) Notice: Subject to any disclaimer, the term of this patent is extended or adjusted under 35 U.S.C. 154(b) by 434 days.

(21) Appl. No.: 13/247,037

(22) Filed: Sep. 28, 2011

(65) Prior Publication Data
US 2013/0077628 A1 Mar. 28, 2013

(51) Int. Cl.
*H04L 12/28* (2006.01)
(52) U.S. Cl.
USPC ......................................................... 370/390
(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529
See application file for complete search history.

(56) References Cited

U.S. PATENT DOCUMENTS

| | | | | |
|---|---|---|---|---|
| 6,631,420 B1 * | 10/2003 | Li et al. | ......................... | 709/242 |
| 2010/0309912 A1 * | 12/2010 | Mehta et al. | .................. | 370/390 |
| 2011/0317703 A1 * | 12/2011 | Dunbar et al. | ................. | 370/392 |

OTHER PUBLICATIONS

The extended European Search Report for Application No. 12185544.9, Jan. 31, 2013, 5 pages.
David Allan et al., Shortest Path Bridging: Efficient Control of Larger Ethernet Networks, IEEE Communications Magazine, Oct. 1, 2010, vol. 48, No. 10, pp. 128-135.
Unbehagen et al., IP/IPVN services with IEEE 802.1aq SPBB network draft-unbehagen-spbb-ip-ipvpn-00.txt, Jul. 6, 2009, XP015063152, pp. 1-19.
"IEEE P802. 1QREV/D1.3; 802-1Q-REV-D1-3" IEEE DRAFT; 802-1Q-REV-D1-3, IEEE-SA, Piscataway, NJ USA, vol. 802.1, No. D1-3, Oct. 12, 2010, XPO17638924, pp. 1-1371.

* cited by examiner

*Primary Examiner* — Jung-Jen Liu
(74) *Attorney, Agent, or Firm* — Anderson Gorecki & Rouille LLP

(57) ABSTRACT

Techniques disclosed herein include systems and methods that extend Protocol Independent Multicast (PIM) protocols to Shortest Path Bridging (SPB) technology. This includes connecting an IP multicast domain across an SPB network. SPB edge routers, also known as Backbone Edge Bridges, form virtual adjacencies with each other. As such, SPB edge routers maintain such PIM adjacency without sending Hello messages. Backbone Edge Bridges (BEBs) are discovered using null Intermediate System To Intermediate System (IS-IS) Internet Protocol Multicast (IPMC) type-length-value (TLV) control messages. Each PIM-enabled BEB records other PIM-enabled BEBs as an adjacent PIM-router in response to receiving a NULL IPMC TLV from those BEBs. Accordingly, PIM-enabled BEBs form a full mesh virtual adjacency between each other and can thereby encapsulate PIM control messages sent and received between two access networks connected to the SPB network.

20 Claims, 6 Drawing Sheets

METHOD TO ROUTE MULTICAST DATA IN SPB NETWORK BY ESTABLISHING THE VIRTUAL PIM ADJACENCY ACROSS THE SPB NETWORKS IN A SINGLE PIM DOMAIN

BACKGROUND

The present disclosure relates to network computing. Computer networks typically include a collection of computing devices enabled to communicate with each other for handling data traffic and control instructions. For example, such devices can include servers, data centers, routers, network switches, management applications, wireless access points, and client computers. Computer networks can provide network connectivity to wired computing devices and/or wireless computing devices.

One type of network technology is known as Shortest Path Bridging (SPB), which is also know as Shortest Path Backbone Bridging (SPBB). A set of standards for implementing Shortest Path Bridging is generally specified by the Institute of Electrical and Electronics Engineers (IEEE). Specifically, this standard is identified as IEEE 802.1aq. Network services, including SPB services are commonly provided using Ethernet technology. Ethernet has become a default Data Link Layer technology for data transport, that is, the default for Layer 2 (L2) of the Open Systems Interconnection (OSI) model. SPB can expand Ethernet technologies to other or larger networks. For example, a network that uses IEEE 802.1aq SPB can advertise both topology and logical network membership. SPB uses a link state protocol for such advertising.

In an SPB network, packets are encapsulated at an edge node either in Mac-in-Mac 802.1ah or Q-in-Q 802.1ad frames and transported only to other members of the logical network. IEEE 802.1aq supports unicast and multicast, and all routing is on symmetric shortest paths. IEEE 802.1aq includes Shortest Path Bridging MAC (SPBM) functionality. There exist other related technologies that follow the model of a provider network (transport network) that connects two or more customer networks (access networks), where the provider network is functionally distinct from the customer network, even if a single administrator runs both networks.

Another technology is Provider Backbone Bridges (PBB) technology. A PBB network is a L2-Bridged network that uses Mac-In-Mac encapsulation to transfer user L2 traffic between two or more L2 networks that are located at the edge of the PBB network (provider network). Note that a PBB network includes all networks that use Mac-In-Mac encapsulation technology, including, but not limited to, networks that use the Shortest Path Bridging Technology commonly referred to as SPB or SPBV or SPBM. The PBB network typically includes a Backbone Edge Bridge (BEB) and a Backbone Core Bridge (BCB). BEBs (also known as provider network edge nodes) function as devices that enable transfer of packets to/from interfaces within the PBB network and to/from interfaces outside the PBB network. BCBs (also known as provider core nodes) enable transfer of packets between interfaces that are within the PBB network.

A network protocol related to SPB is known as Intermediate System To Intermediate System (IS-IS). IS-IS is a routing protocol that routes data by determining a best route for datagrams transmitted through a packet-switched network. The IS-IS protocol is published by Internet Engineering Task Force (IETF) as an Internet Standard in RFC 1142, as well as in International Organization for Standardization (ISO)/International Electrotechnical Commission (IEC) 10589:2002. SPB Networks can use IS-IS as a control protocol and type-length-value (TLV) structures for control messaging. A TLV structure allows optional information to be encoded within a given packet.

Multicasting is a point-to-multipoint model for delivery of information from one source to a group of destination computers. There are various protocols for implementing multicasting in Internet Protocol (IP) networks. For example, one technology is Protocol-Independent Multicast (PIM). PIM includes a few different protocols that can create different distribution trees for sending data packets to interested receivers (or groups of interested receivers) in a single transmission.

SUMMARY

Shortest Path Bridging (SPB) technology provides fast and reliable carrier networks because SPB dramatically simplifies data packet transport by encapsulating customer headers with transport network headers, and then forwarding based on the encapsulation headers. Certain related disclosures, such as those owned by Avaya, Inc., of Lincroft, N.J., provide functionality beyond the standard specification for SPB technology, in that techniques from these disclosures provide certain advanced Layer 3 (L3) routing capabilities. One such enhancement is support for Internet Protocol (IP) Multicast Traffic over an SPB network.

A common IP multicasting management technology is Protocol Independent Multicast (PIM.) One particular variety of PIM is PIM Sparse Mode (PIM-SM). The PIM-SM Internet Standard can be found in RFC 4601. PIM-SM is a multicast routing protocol that can use an underlying unicast routing information base, or that can use a separate multicast-capable routing information base. PIM-SM functions by building a unidirectional shared tree rooted at a Rendezvous point (RP) per receiver group. PIM-SM can optionally create shortest-path trees per source. PIM-SM works in conventional IP networks. Another variety of PIM is PIM source-specific multicast (PIM-SSM).

There are several challenges in extending PIM (including PIM-SM and PIM-SSM) over SPB networks. One challenge is that PIM does not conventionally extend over an SPB domain, in part because no such definition or mechanism exists to discover PIM neighbors over the SPB cloud. Another challenge is a need to have PIM adjacency to exchange PIM control frames. There is also a need to avoid flooding PIM control messages (Hellos, Join/Prune, etc.) between a large number of PIM neighbors across an SPB cloud. This is a drawback for solutions that do not use techniques disclosed herein. Another challenge is a need within a single domain for all multicast routes to be able to send control messages towards the RP.

Techniques disclosed herein extend PIM-SM/PIM-SSM to SPB technology, create multicast trees in an SPB network, and build multicast forwarding records that transmit multicast data across the SPB network. In a conventional PIM-SM domain, a Rendezvous Point (RP) is a root of a shared tree. Accordingly, corresponding receivers send join messages to the RP. When a given source begins sending multicast data, a first hop router sends a register message to the RP. With techniques disclosed herein, SPB Edge routers (also called as Backbone Edge Routers (BEBs)) form virtual adjacency with each other. With such virtual adjacency established, SPB Edge routers then do not send and receive hello messages from other BEBs in the SPB network, but are instead discovered using null IS-IS IP multicast type-length-value (TLV) information. All participating (PIM enabled) BEBs form a fully meshed virtual adjacency. With this technique, an entire network (encompassing IP access networks and an SPB network) can be logical identified as within a single multicast domain.

PIM-SM and PIM-SSM rely on underlying routing protocols to discover the route to the RP. In this case, the underlying routing protocols can be a combination of Open Shortest Path First (OSPF) and SPB-shortcuts or IP-virtual private network (IP-VPN). PIM-SM and/or PIM-SSM control messages are sent as a unicast transmission to corresponding virtual neighbor nodes. Such a technique helps build a shared root at the RP crossing SPB networks. When actual data starts flowing (or before), a particular BEB receiving the multicast data forms an IS-IS IP multicast TLV using corresponding multicast sender information. Subsequently, an IS-IS Link State Packet (LSP) containing the IP multicast TLV is flooded in corresponding SPB Networks. An LSP is a packet of information generated by a network router in a link state routing protocol, and that lists neighbors of a particular router. Flooding the SPB network with the IS-IS LSP containing the IP-multicast TLV initiates building a multicast tree in the SPB network. As a result, all BEBs in the SPB receive this TLV. Those BEBs having a receive interest will send an IS-IS IP-multicast TLV with corresponding receiver information. In response, the multicast tree in the SPB network is created using the IS-IS IP-multicast TLVs sent by the participating BEBs.

Such a solution defines a system to run PIM across SPB networks. In this solution, PIM adjacency in one or more SPB networks is discovered by null IS-IS IP-multicast TLV control messages. By using null IS-IS IP-multicast TLV messages, the PIM discovers its neighbors so that there is no need to send periodic Hellos within the SPB, thereby reducing control traffic messaging. When a receiver joins and the RP is across the SPB network, then a PIM join/prune message is sent with SPB encapsulation to its corresponding virtual neighbor towards the RP. This process helps create a multicast tree rooted at the RP across the SPB domain. Accordingly, techniques disclosed herein provide a method for routing multicast data across SPB networks in a single PIM domain.

One embodiment includes a multicast manager that executes a multicast routing process and/or system within a Shortest Path Bridging (SPB) network. The multicast manager receives a first control message at a first data switching device. The first data switching device functions as a first Backbone Edge Bridge within a transport network. This transport network uses Shortest Path Bridging protocol. The first data switching device also functions as a first Protocol Independent Multicast (PIM) router. The first data switching device is connected to a first access network, that is, the first data switching device is connected to at least on PIM router within the access network. The first control message originates from a second data switching device. The second data switching device functions as a second Backbone Edge Bridge within the transport network. The second data switching device is connected to a second access network. The second data switching device can be more than one hop away from the first data switching device.

In response to interpreting the first control message as signaling that the second data switching device is also functioning as a second PIM router, the multicast manager adds the second data switching device to a record that indicates Backbone Edge Bridges within the transport network having PIM adjacency with the first data switching device. In other words, this record or table lists BEBs that are PIM neighbors to the first data switching device regardless of how may hops away each BEB is located.

The multicast manager 140 then can receive a PIM Join control message at the first data switching device from the first access network. The multicast manager then encapsulates this PIM Join control message using Mac-in-Mac encapsulation and transmits the PIM Join control message towards a PIM rendezvous point RP via the transport network, such as through the second data switching device.

In another embodiment, the multicast manager 140 at the first data switching device generates a second control message signaling that the first data switching device is the first PIM router. This can be a null IS-IS control message. The multicast manager transmits the second control message to Backbone Edge Bridges within the transport network so that other PIM-enabled BEBs know that the first data switching device is a Virtual PIM adjacent neighbor node within the SPB network.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform (or causes the processor to perform) the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: receiving a first control message at a first data switching device, the first data switching device functioning as a first Backbone Edge Bridge within a transport network using Shortest Path Bridging protocol, the first data switching device also functioning as a first Protocol Independent Multicast (PIM) router, the first data switching device connected to a first access network, the first control message originating from a second data switching device, the second data switching device functioning as a second Backbone Edge Bridge within the transport network, the second data switching device connected to a second access network; in response to interpreting the first control message as signaling that the second data switching device is also functioning as a second PIM router, adding the second data switching device to a record that indicates Backbone Edge Bridges within the transport network having PIM adjacency with the first data switching device; receiving a PIM Join control message at the first data switching device from the first access network; and encapsulating the PIM Join control message using Mac-in-Mac encapsulation and transmitting the PIM Join control message towards a PIM rendezvous point RP via the transport network. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Avaya, Inc. of Lincroft, N.J.

As discussed above, techniques herein are well suited for use in software applications supporting multicast routing. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Figure 1:
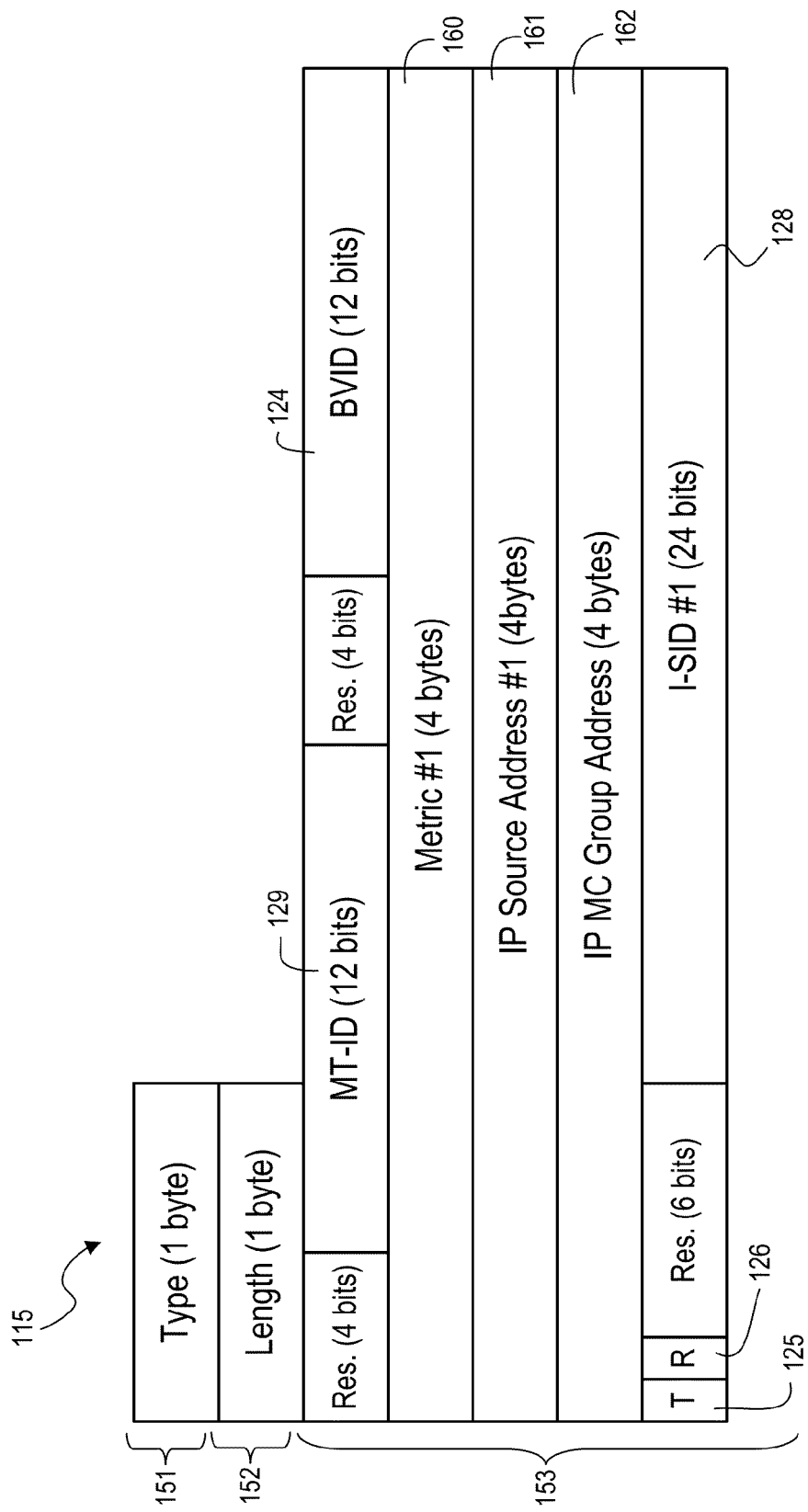
FIG. 1 is a diagram of an SPB-MAC ISID service TLV used to signal the generation of the multicast tree within the SPB network, according to embodiments herein.

Techniques disclosed herein include systems and methods that transport Protocol Independent Multicast (PIM) protocol messages over Shortest Path Bridging (SPB) technology. This includes connecting an IP multicast domain across an SPB network.

SPB edge routers, also known as Backbone Edge Bridges, form virtual adjacencies with each other. As such, SPB edge routers maintain such PIM adjacency without sending Hello messages. Backbone Edge Bridges (BEBs) are discovered using null Intermediate System To Intermediate System (IS-IS) Internet Protocol Multicast (IPMC) type-length-value (TLV) control messages. In one technique, the type in the TLV is set to IPMC and the length and/or value are set to zero. Each PIM-enabled BEB records all other PIM-enabled BEBs as an adjacent PIM-router in response to receiving the NULL IPMC TLV from those BEBs. Accordingly, PIM-enabled BEBs form a fully mesh virtual adjacency between each other and can thereby encapsulate PIM control messages sent and received between two access networks connected to the SPB network.

Thus, techniques disclosed herein connect IP multicast senders and receivers over an SPB cloud (network). Connecting such senders and receivers across a transport network (such as an SPB network) is conventionally not possible. Conventionally, IP multicast protocols either end at the edge of the SPB network, that is, the multicast information does not cross the boundary between customer/access networks and the SPB network, or such protocol messages are flooded to all nodes participating in a Layer 2 Virtual Services Network (L2VSN). Because the SPB network functions using an encapsulation transport mechanism (in part for simplified transport), the PIM protocol is not defined for implementation within the SPB network. With techniques disclosed herein, however, multicast information from access networks is able to cross the SPB cloud. This includes passing information using Protocol Independent Multicast (PIM).

In conventional IP networks, multicast trees are commonly created by a protocol called PIM. Using PIM in a transport network, however, is challenging because the SPB network encapsulates data packets and then forwards data packets based on encapsulation headers instead of interpreting customer-specific data. Encapsulating customer data increases speed and forwarding performance of an SPB network because the SPB network does not need to interpret underlying customer headers. Core nodes within the SPB network can then forward data packets very efficiently. Accordingly, the SPB specification does not support forwarding PIM protocol messages. Instead, SPB functions as a bridging domain using protocols different than those used by the IP multicast domain(s).

Conventionally, two PIM routers within an IP multicast access network (IP multi-cast domain) form PIM adjacency between each other. Typically, these two nodes functioning as PIM routers are one hop away from each other (physically or logically). After establishing PIM adjacency with each other, these nodes send information back and forth between each other to establish what multicast data streams each PIM router has, and what receivers each router has. The PIM protocol is used to build multicast forwarding trees, typically within IP multicasting domains only. Other multicast protocols exist, though PIM is the most deployed IP multicast routing protocol. Other multicast protocols include Distance Vector Multicast Routing Protocol (DVMRP) and Multicast Open Shortest Path First (MOSPF), among others.

In general, there are two multicast approaches or models for managing multicast streaming. One approach is a flood and prune approach in which multicast traffic is flooded on all interfaces within an IP multicast domain, and then receivers that are not a part of a particular multicast data stream will send control messages to be pruned or removed from that particular multicast data stream. In this approach, multicast traffic is initially sent to all receivers, but then eventually sent only to interested receivers as non-interested receivers prune themselves from the multicast tree. PIM Dense Mode (PIM-DM) uses this flood and prune approach. This approach can be useful in networks that have senders and receivers closely connected, and/or in which the network is relatively small and can easily handle the amount of flooded traffic.

The second general multicast approach or model is request-based, in which multicast traffic is transmitted after receiving a request from receivers to join that multicast stream. PIM Sparse Mode (PIM-SM) and PIM source-specific multicast (PIM-SSM) use this request-based approach. To accomplish this, PIM uses what are called Rendezvous Points to help manage join requests. Typically, one of the PIM routers in the IP multicast domain functions as the RP for a particular group of receivers. Rendezvous Points can be statically or dynamically selected and configured. The Rendezvous Point (RP) builds a shared tree for use by other PIM routers. As such, the RP essentially becomes a multicast management server for one or more IP multicast domains.

In a working multicast domain using an RP, when a given PIM router learns about an available multicast data stream from a source, that PIM router extracts information about the stream, and then sends a PIM join message upstream towards the RP. This PIM join message may pass through one or more intermediate routers. IP multicast traffic is then sent towards the RP, which then forwards the multicast traffic to any requesting receivers. Note that all multicast traffic does not need to pass through the RP because the rendezvous point can signal PIM routers to use a shorter path between the sender and receiver.

PIM routers that are connected to each other are referred to as adjacent routers. Adjacent routers are routers that are typically one hop away from each other, and coordinate to form the adjacency. Thus, adjacent routers are routers that are within the same multicast domain, and located one hop away from each other.

Techniques disclosed herein include establishing virtual adjacency within the SPB network so as to connect two or more IP multicast domains via the SPB cloud. These techniques involve creating a fully-meshed adjacency between/among edge nodes of the SPB network. A given SPB network can be configured to advertise a particular multicast data stream using IS-IS protocol control messaging. Two or more edge nodes in the SPB network are configured and functioning as virtual PIM routers so that IP multicast domains can span the SPB cloud. This adjacency is virtual in part because such adjacency is maintained within the SPB network without requiring "Hello" messages.

Techniques disclosed herein include sending IS-IS TLVs with the value portion of this TLV null or zeroed out, or the length set as zero. The SPB network then interprets such a null value as identifying where Backbone Edge Bridges—functioning as PIM routers—are located. Upon locating PIM routers, adjacency is formed between these PIM router-BEB's. This TLV information can be flooded within the SPB network according to IS-IS messaging protocol.

In an IP multicast PIM domain, PIM routers need to be adjacent to each other (according to the unicast routing table) to send PIM messages upstream or downstream. If a given IP multicast router has not received a Hello from a next-hop router (such as receiving a Hello message within a certain threshold of time), then there is no adjacency established, or any adjacency established has been lost. Hello messages are typically unsolicited, periodic messages that (in this context) are broadcast within a VLAN to advertise local connectivity or availability as a PIM router within an IP multicast domain. The basis of sending such control messages is to form adjacency. If an adjacent router is not functioning as a PIM router, then there is no adjacency or PIM connectivity established. In conventional IP networks, PIM routers send hello message constantly, such as every 10-15 seconds.

Conventionally the PIM protocol does not extend over the SPB network. The challenge then is to extend PIM protocol over the SPB network without all of the individual nodes within the SPB cloud being PIM enabled. Thus, an effective solution, as disclosed herein, extends PIM protocol over the SPB network without configuring Backbone Core Bridges (BCBs) as PIM devices. Thus, only edge nodes within the SPB cloud should be enabled as PIM routers maintain simple and efficient transport within the SPB network. This creates a single multicast domain model solution, and provides a PIM interface using virtual adjacency to connect an IP multicast domain across the SPB network. In other words, this solution connects the senders and the receivers across the SPB network as a single PIM domain.

To establish adjacency, BEBs within the SPB network—that are also functioning as PIM routers—send a null IS-IS TLV between virtually adjacent routers, that is, between all BEBs in the SPB. Each BEB that is functioning with PIM enabled sends a respective null IS-IS TLV to all other BEBs within the SPB network. By way of a non-limiting example, one such TLV that can be used for such messaging is the IS-IS IPMC TLV. With SPB, IS-IS can carry different services. One of these services is the multicast service, and one of the services is the unicast service in which the network sends IP routing information over the SPB cloud. These services can be carried in one or more specific IS-IS TLVs.

FIG. 1 is a representation of such an IP/SPBB Multicast TLV control message 115, also called a Multicast Flow Specific TLV 115. Without being set as a null TLV, control message 115 includes a type portion 151, a length portion 152, and a value portion 153. The type portion or type field indicates how the subsequent data and/or data fields should be interpreted. The type field can indicate that this is a Multicast Flow Specific TLV (IPMC TLV), which triggers corresponding interpretation at network nodes. An amount of data and fields can be indicated in the length field 152. The value portion (when used for purposes other than establishing virtual PIM adjacency) includes multi-topology identification field 129, Backbone Virtual Local Area Network identifier (BVID) field 124, metric field 160, IP source address field 161, IP group/destination address field 162, transmitter bit 125, receiver bit 126, and I-SID field 128. Fields identified as "Res." can be used for conveying various additional information. This is a top-level TLV that can be used for routing of IP multicasting. Note that FIG. 1 shows a representation of the IPMC TLV when used for an intended purpose, but these value fields are merely shown for context. While this particular type of TLV (or other type of TLV) can be used with techniques disclosed herein, such use includes setting such TLV as a null TLV. Using an existing or known TLV type means that a new TLV does not need to be created, defined, and or standardized.

A "null" IS-IS TLV, as used herein, includes TLVs with the value and/or length portions set to zero. For example, if the Length field 152 is set to zero, then this indicates no subsequent bits to process for this TLV. Alternatively, the Length field can be set to a non-zero value (equal to the actual value of a specified TLV), and then all subsequent fields are set to zero (for example, VID, source, group, etc., are all set to zero).

Upon receiving the null IS-IS TLV, each BEB that is functioning with PIM enabled will interpret this null TLV to mean that the corresponding identified BEB is a virtually adjacent PIM device. Note that BCBs will essentially ignore null IS-IS IP MC TLV. All BEBs that send the null IS-IS TLV become potential candidates as a virtually adjacent neighbor/virtual PIM neighbor. That is, these BEBs will be added to a virtual neighbor table. Each BEB enabled as a PIM router will begin sending null IS-IS TLVs. Each BEB can have multiple PIM neighbors. These are virtual members because they do not send any hello messages, and are instead presumed to be virtual neighbors upon receiving the null IS-IS TLV.

If a given BEB ceases to be a PIM router, then a subsequent IS-IS control message transmission would not include the null IS-IS TLV as a way of signaling this update. This is the next IS-IS update sent out according to IS-IS protocol. Other BEBs interpreting the absence of a null IS-IS TLV interpret this absence as the corresponding BEB no longer being a PIM router or being a disabled PIM router. Accordingly, this virtual PIM neighbor would be removed from the virtual PIM neighbor table. Each BEB within the SPB that has PIM enabled is virtually adjacent to all other BEBs within the SPB that have PIM enabled. Thus, instead of requiring constant Hello messages, null IS-IS TLV messages sent among the BEBs form an IP multicasting state within the SPB network. Accordingly, there is no need for a soft state of sending Hello messages across the cloud. Such a technique can apply to other Virtual Routing Tables as well.

IS-IS can be used for managing SPB networks. With IS-IS, when a given node within the SPB network sends new information, the given node sends this information as a new or updated Link State Packet (LSP) with the old information absent/removed. This absence is then interpreted by receiving nodes (receiving BEBs) as the given node being removed as a PIM router. Even if there is no change in the state of the SPB network, SPB nodes typically send an LSP to refresh their state. This can be accomplished by sending the same LSP with a same sequence number so that nodes interpret this simply as a refresh without needing to interpret all the included values. Many additions or deletions can trigger sending a new LSP with a new sequence number, which signals changed information that needs to be processed. The LSP header has the information of the sending BEB, and so when identifying a null TLV, the receiving BEB can identify the BEB that sent the null TLV. In contrast to Hello messages that are being sent by each IP router about every 10 seconds, LSPs are not required to maintain a state, and are typically sent about once or twice an hour.

Instead of modeling the SPB network as a PIM broadcast network, the SPB network is modeled such that each PIM-enabled BEB is an independent neighbor of other PIM-enabled BEBs. In the conventional IP multicast network, PIM messages are broadcast to everybody, but such a technique here would defeat the purpose of the SPB network, and so the PIM protocol is not conventionally functional with SPB networks.

After virtual adjacency is established, PIM multicast traffic can be sent to all of the virtual neighbors. Virtual PIM routers within the SPB network are now part of a single PIM domain, and so by virtue of the PIM protocol a location of the rendezvous point is known. This rendezvous point could be one of the PIM enabled BEBs, or an IP router located logically outside of the SPB network. A shared tree is then formed being rooted at the RP. With virtual adjacency established, a given or new multicast stream or resource can be made available.

Figure 2:
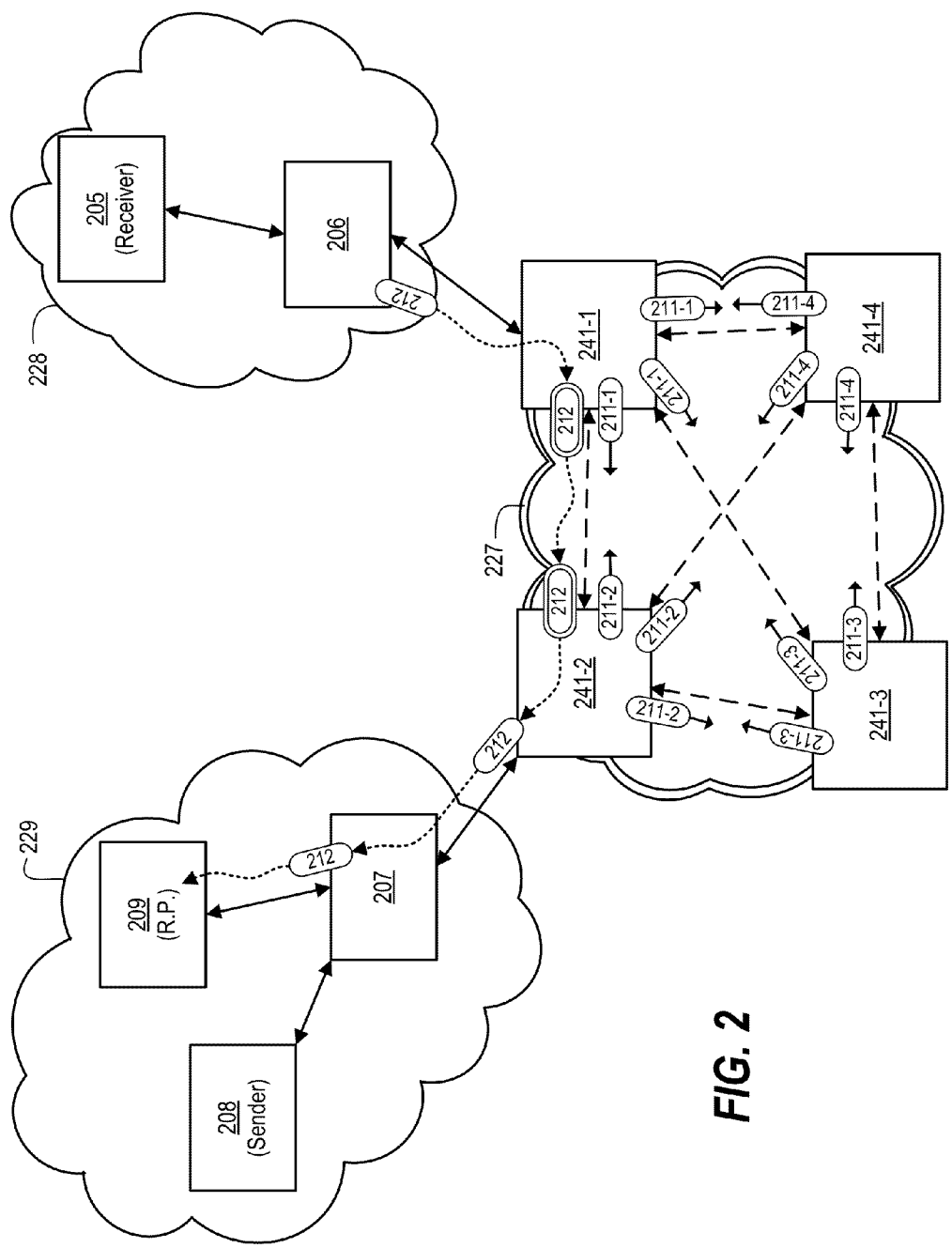
FIG. 2 is a diagram of a single multicast domain including an SPB network having nodes with virtual PIM adjacency according to embodiments herein.

FIG. 2 illustrates an IP multicast domain that spans an SPB network, as well as establishing virtual PIM adjacency within the SPB network 227. SPB network 227 includes BEBs 241-1, 241-2, 241-3, and 241-4. Note that SPB network 227 can include multiple Backbone Core Bridges located between and among the edge nodes, though these BCBs are not shown in the figures. The dashed lines between BEBs indicate virtual adjacent and intermediate SPB nodes. In this example, each BEB has been enabled to function as a PIM router in addition to functioning as a BEB. To establish virtual PIM adjacency, each BEB participating as a PIM router sends an IS-IS control message through out the SPB network 227. This is shown as control messages 211 being sent to all nodes within the SPB network. The IS-IS control message is a null IS-IS TLV included in a Link State Packet. Each BEB receiving such a null IS-IS TLV records the sending node within a table listing BEBs that are virtual PIM routers. Accordingly, each BEB becomes an independent neighbor of other PIM enabled BEBs, regardless of a number of intervening hops between two given PIM-enabled BEBs. Virtual PIM adjacency is maintained without receiving conventional PIM Hello messages. PIM adjacency can be removed by a BEB sending an updated Link State Packet that does not include a null IS-IS TLV.

With virtual adjacency established, an IP multicast domain can span the SPB network 227 to create shared trees. For example, Receiver 205 would like to receive a multicast data stream from Sender 208. Receiver 205 and PIM Router 206 are logically part of Access network 228. Sender 208, PIM Router 207, and PIM Router 209 are logically part of Access network 229. Access networks 228 and 229 are connected to each other via SPB network 227. PIM Router 209 functions as the Rendezvous Point (RP) for this multicast domain. Receiver 205 signals to PIM Router 206 an interest in Sender 208's multicast data stream. PIM Router 206 does a lookup to determine which node is the RP for a corresponding group of receivers, then sends a PIM Join message towards the RP 229 via PIM-enabled BEB 241-1. BEB 241-1 encapsulates PIM Join message 212 and sends this message 212 toward RP 209 via the SPB network. Encapsulated PIM Join message 212 may be forwarded by one or more intermediate BCBs before reaching BEB 241-2. Backbone core nodes simply identify the destination backbone edge bridge and forward according to the unicast SPB transport mechanism. BEB 241-2 then removes the encapsulation and forwards PIM Join message 212 towards RP 209 via PIM Router 207. Upon receiving PIM Join 212 (or other PIM control messages), RP 209 can establish a shared PIM tree that connects networks 228 and 229 across SPB network 227.

A benefit of techniques disclosed herein is essentially converting the PIM soft-state protocol to a hard-state protocol within the SPB. The result is that this technique removes some of the inherent complexities within the multicast broadcast domain. For example, the join and prune message processing in the multicast network tends to be complex. Such virtual adjacency, however, essentially turns off all of the unnecessary periodic messaging (Hello messaging) that would have been needed within the SPB network to implement PIM according to its specification. In other words, techniques disclosed herein model the SPB network as a multiple point-to-point interface, passing messages transparently, so that the conventional PIM Protocol messaging can extend across the SPB network.

Such techniques enable forming virtual PIM adjacencies across the SPB cloud without implementing a soft state, but instead having a hard state that depends on IS-IS control messaging to natively discover which nodes are edge nodes (differentiate backbone edge bridges from backbone core bridges), and to identify which BEBs are enabled as PIM routers. By sending and interpreting null IPMC TLV control messages, the SPB network forms virtual adjacencies, which can send across whatever PIM messages are received from the PIM broadcast domain. A PIM BEB then becomes a gateway and interacts with the SPB network and the with the PIM Multicast domain. Thus, any native PIM protocol broadcast messages transmitted within the multicast domain can now be transmitted across the SPB cloud.

Once such virtual PIM adjacencies within the SPB are formed, and there are senders and receivers connected to the rendezvous point, then when the actual multicast data traffic flows, the system can create a multicast data tree in the SPB network, and the multicast data will flow. Thus, establishing such virtual adjacencies provides a trigger to build a multicast data tree to the SPB network based on IS-IS TLVs. Note that a multicast data tree created by the SPB network is different from a tree created by the RP located outside of the SPB network. The RP knows which BEB endpoint is a PIM router, but is unaware of the core nodes within the SPB network and how to reach them and the other edge nodes directly. Also note that one of the PIM-enabled BEBs can function as a RP for a given group of receivers, instead of having the RP functioning in one of the access nodes.

Figure 5:
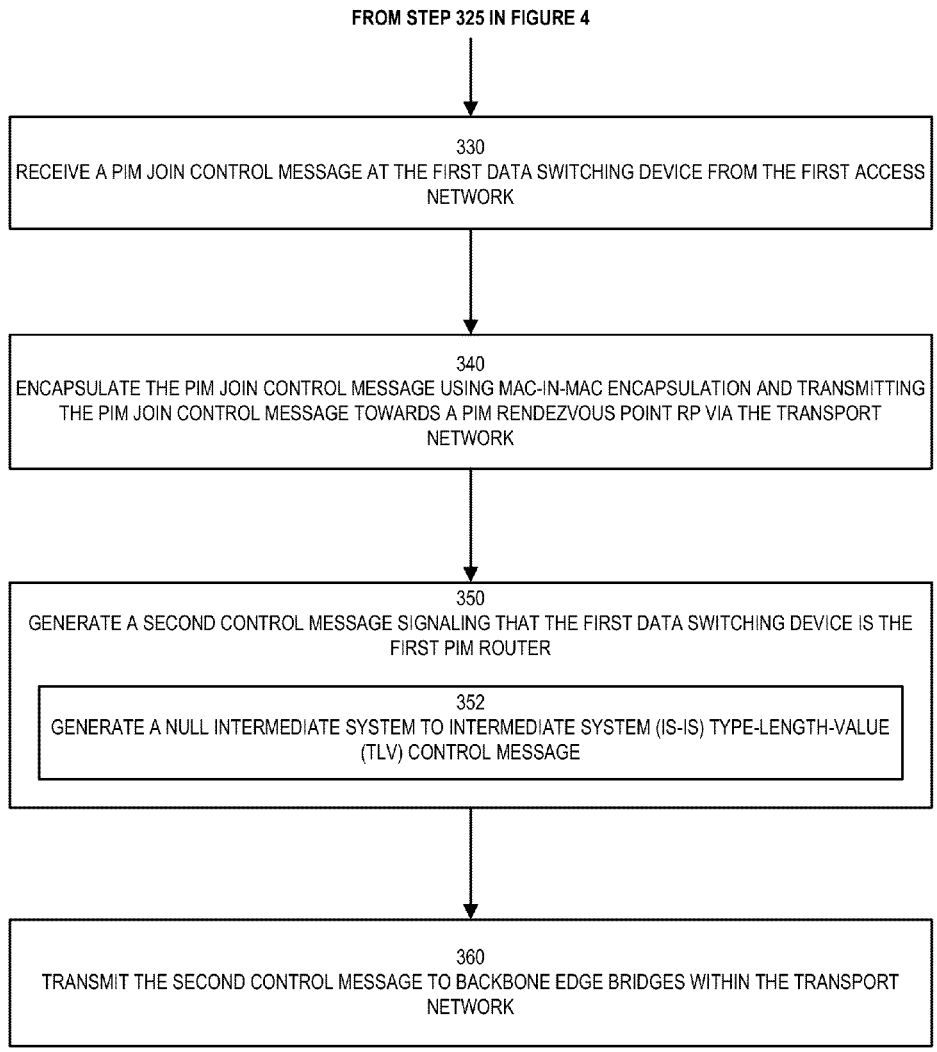
Figure 6:
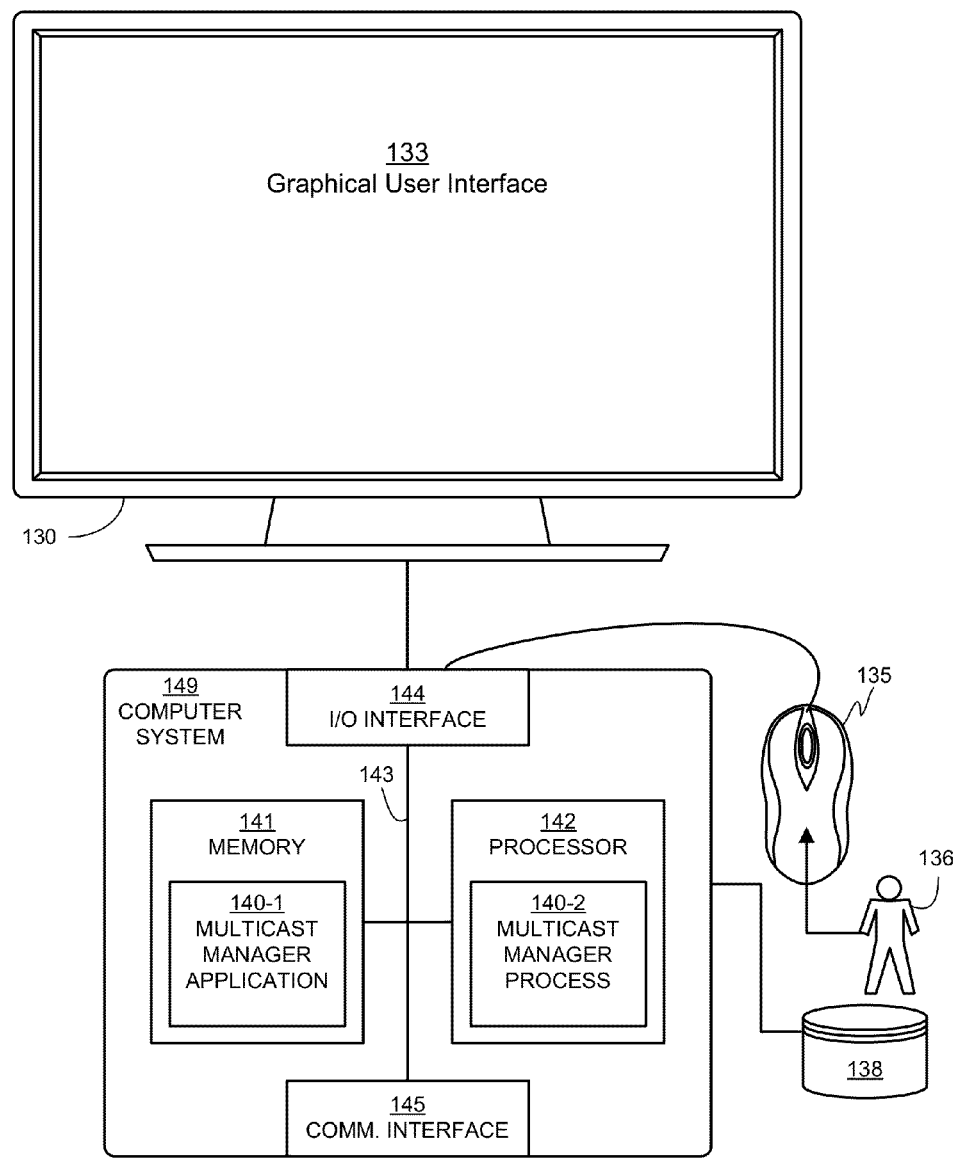
FIG. 6 is an example block diagram of a multicast manager operating in a computer/network environment according to embodiments herein.

FIG. 6 illustrates an example block diagram of a multicast manager 140 operating in a computer/network environment according to embodiments herein. Computer system hardware aspects of FIG. 6 will be described in more detail following a description of the flow charts. Functionality associated with multicast manager 140 will now be discussed via flowcharts and diagrams in FIG. 3 through FIG. 5. For purposes of the following discussion, the multicast manager 140 or other appropriate entity performs steps in the flowcharts.

Figure 3:
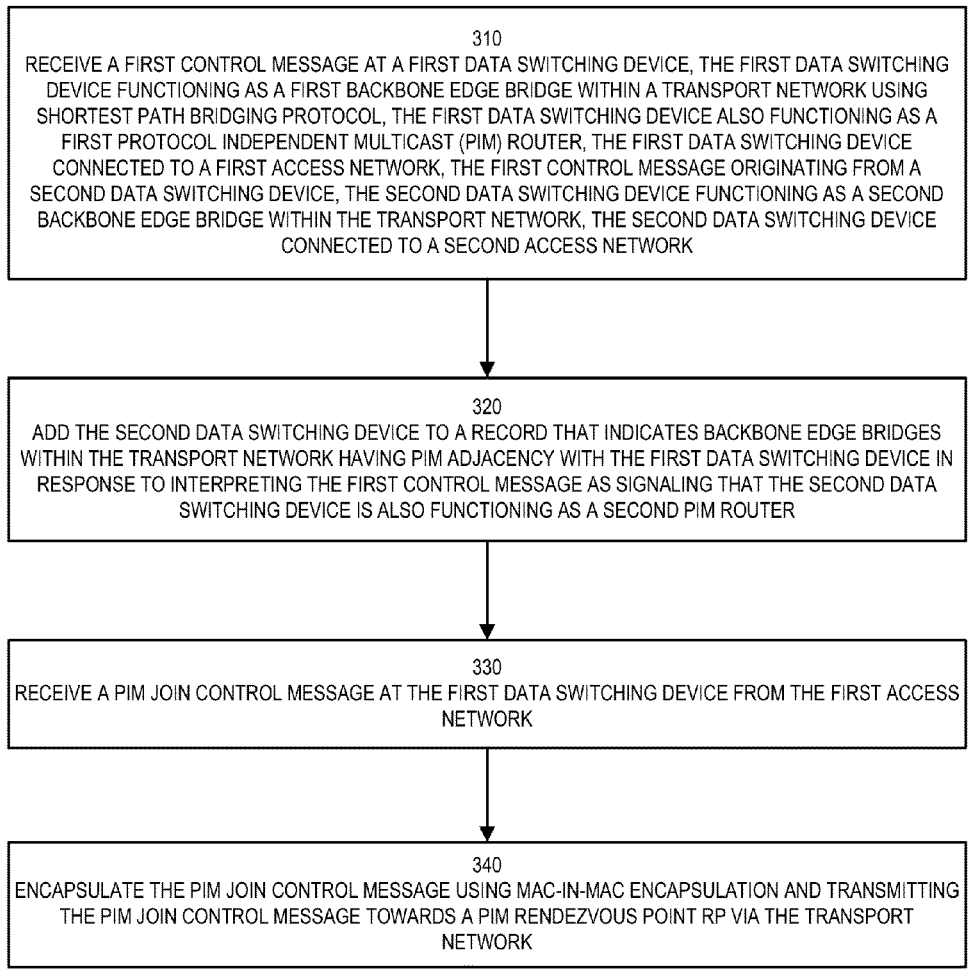
FIG. 3 is a flowchart illustrating an example of a process that supports establishing virtual PIM adjacency within an SPB network according to embodiments herein.

Now describing embodiments more specifically, FIG. 3 is a flow chart illustrating embodiments disclosed herein. In step 310, multicast manager 140 receives a first control message at a first data switching device. The first data switching device is functioning as a first Backbone Edge Bridge within a transport network using Shortest Path Bridging protocol. The first data switching device is also functioning as a first Protocol Independent Multicast (PIM) router. The first data switching device is connected to a first access network having at least one PIM router. The first control message originates from a second data switching device. The second data switching device is functioning as a second Backbone Edge Bridge within the transport network. The second data switching device is connected to a second access network having at least one PIM router. The data switching devices can include devices configured to perform packet forwarding, bridging, and routing operations, and typically operate with a control plane and a data plane. Note that labels "first," "second," etc., merely distinguish entities identified in the claims, and do not imply sequencing or order of processing.

In step 320, multicast manager 140 adds the second data switching device to a record that indicates Backbone Edge Bridges within the transport network having PIM adjacency with the first data switching device. Adding this entry to the record is in response to interpreting the first control message as signaling that the second data switching device is also functioning as a second PIM router, thereby establishing virtual PIM adjacency.

In step 330, multicast manager 140 receives a PIM Join control message at the first data switching device from the first access network or from a PIM router within the first access network.

In step 340, the first data switching device encapsulates the PIM Join control message using Mac-in-Mac encapsulation and transmits the encapsulated PIM Join control message towards a PIM rendezvous point RP via the transport network. Specifically, the first data switching device identifies a corresponding BEB in the SPB network using the record of PIM-enabled BEBs and then forwards the encapsulated PIM join message according to SPB unicast mechanisms.

Figure 4:
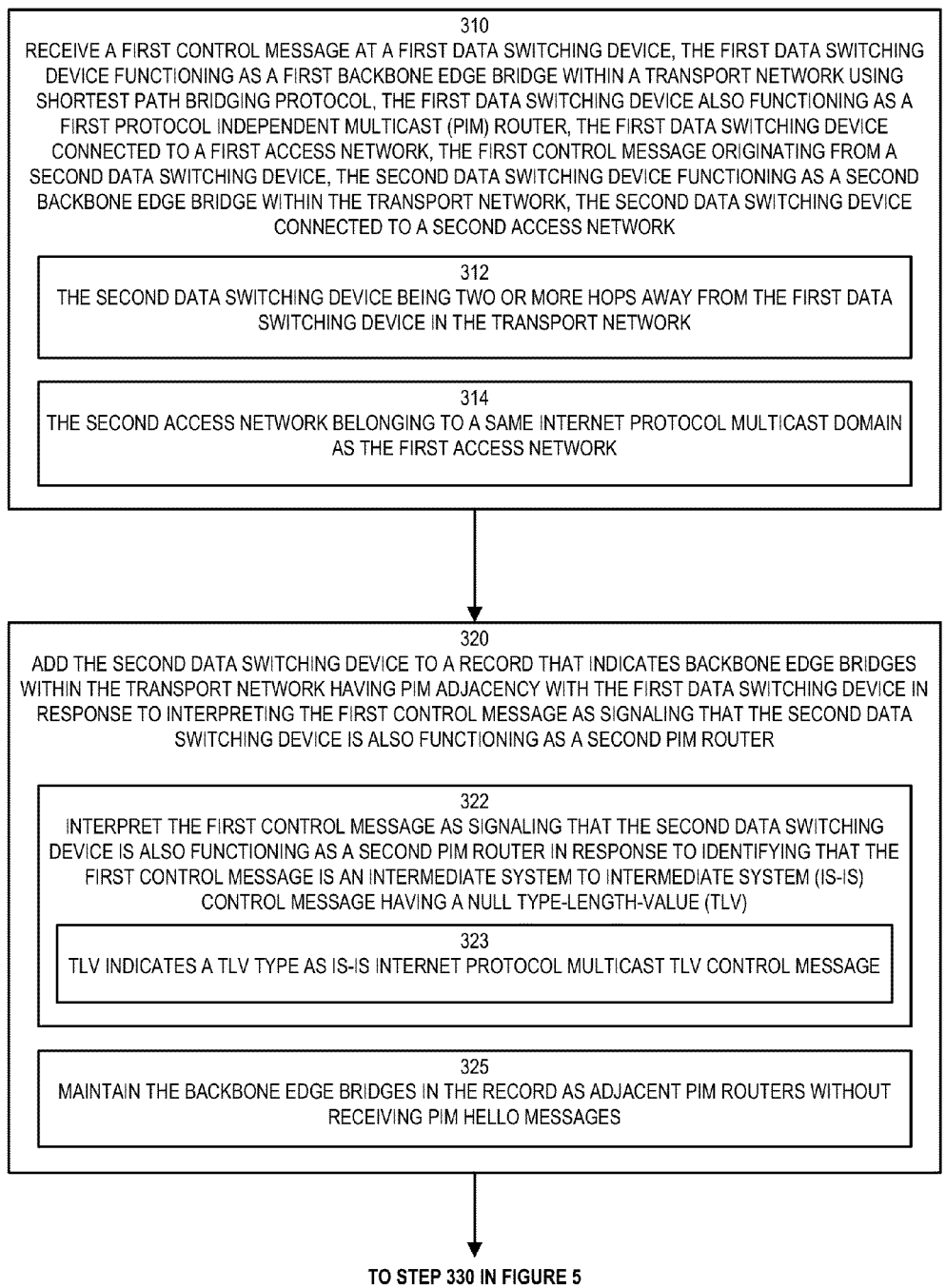
FIGS. 4-5 are a flowchart illustrating an example of a process that supports establishing virtual PIM adjacency within an SPB network according to embodiments herein.

FIGS. 4-5 include a flow chart illustrating additional and/or alternative embodiments and optional functionality of the multicast manager 140 as disclosed herein.

In step 310, multicast manager 140 receives a first control message at a first data switching device. The first data switching device is functioning as a first Backbone Edge Bridge within a transport network using Shortest Path Bridging protocol. The first data switching device is also functioning as a first Protocol Independent Multicast (PIM) router. The first data switching device is connected to a first access network having at least one PIM router. The first control message originates from a second data switching device. The second data switching device is functioning as a second Backbone Edge Bridge within the transport network. The second data switching device is connected to a second access network having at least one PIM router.

In step 312, the second data switching device is two or more hops away from the first data switching device in the transport network. In other words, the first data switching device received the first control message from a BEB which is not logically adjacent, but instead more than one hop or node away.

In step 314, the second access network belongs to a same Internet Protocol multicast domain as the first access network. Thus, a single RP can be located in one of the access networks, and this RP is used by PIM Routers from each access point, thereby functioning as a single multicast domain.

In step 320, multicast manager 140 adds the second data switching device to a record that indicates Backbone Edge Bridges within the transport network having PIM adjacency with the first data switching device. Adding this entry to the record is in response to interpreting the first control message as signaling that the second data switching device is also functioning as a second PIM router.

In step 322, the multicast manager 140 interprets the first control message as signaling that the second data switching device is also functioning as a second PIM router, and this interpretation is in response to identifying that the first control message is an Intermediate System To Intermediate System (IS-IS) control message having a null type-length-value (TLV). Thus, each BEB can include logic that triggers this interpretation when receiving a null IS-IS TLV, or other control message mechanism.

In step 323, the TLV indicates a TLV type as IS-IS Internet Protocol Multicast TLV control message, such as is shown in FIG. 1.

In step 325, the multicast manager 140 maintains the Backbone Edge Bridges in the record as adjacent PIM routers without receiving PIM Hello messages. Thus, the multicast manager 140 does not require conventional PIM control messages to maintain this state.

In step 330, multicast manager 140 receives a PIM Join control message at the first data switching device from the first access network or from a PIM router within the first access network.

In step 340, the first data switching device encapsulates the PIM Join control message using Mac-in-Mac encapsulation and transmits the encapsulated PIM Join control message towards a PIM rendezvous point RP via the transport network. Specifically, the first data switching device identifies a corresponding BEB in the SPB network using the record of PIM-enabled BEBs and then forwards the encapsulated PIM join message according to SPB unicast mechanisms.

In step 350, the multicast manager 140 generates a second control message that signals that the first data switching device is the first PIM router.

In step 352, the multicast manager 140 generates this second control message as a null Intermediate System To Intermediate System (IS-IS) type-length-value (TLV) control message.

In step 360, the first data switching device transmits the second control message to Backbone Edge Bridges within the transport network, so that other PIM-enabled BEBs can update respective virtual adjacency tables.

Continuing with FIG. 6, the following discussion provides a basic embodiment indicating how to carry out functionality associated with the multicast manager 140 as discussed above. It should be noted, however, that the actual configuration for carrying out the multicast manager 140 can vary depending on a respective application. For example, computer system 149 can include one or multiple computers that carry out the processing as described herein.

In different embodiments, computer system 149 may be any of various types of devices, including, but not limited to, a cell phone, a personal computer system, desktop computer, laptop, notebook, or netbook computer, mainframe computer system, handheld computer, workstation, network computer, router, network switch, bridge, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the multicast manager 140 of computer system 149 to communicate over a network and, if necessary, retrieve any data required to create views, process content, communicate with a user, etc. according to embodiments herein.

As shown, memory system 141 is encoded with multicast manager 140-1 that supports functionality as discussed above and as discussed further below. Multicast manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the multicast manager 140-1. Execution of the multicast manager 140-1 produces processing functionality in multicast manager process 140-2. In other words, the multicast manager process 140-2 represents one or more portions of the multicast manager 140 performing within or upon the processor 142 in the computer system 149.

It should be noted that, in addition to the multicast manager process 140-2 that carries out method operations as discussed herein, other embodiments herein include the multicast manager 140-1 itself (i.e., the un-executed or non-performing logic instructions and/or data). The multicast manager 140-1 may be stored on a non-transitory, tangible computer-readable storage medium including computer readable storage media such as floppy disk, hard disk, optical medium, etc. According to other embodiments, the multicast manager 140-1 can also be stored in a memory type system such as in firmware, read only memory (ROM), or, as in this example, as executable code within the memory system 141.

In addition to these embodiments, it should also be noted that other embodiments herein include the execution of the multicast manager 140-1 in processor 142 as the multicast manager process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method for packet switching in a Shortest Path Bridging (SPB) network, the computer-implemented method comprising:

receiving a first control message at a first data switching device, the first data switching device functioning as a first Backbone Edge Bridge within a transport network using Shortest Path Bridging protocol, the first data switching device also functioning as a first Protocol Independent Multicast (PIM) router, the first data switching device connected to a first access network, the first control message originating from a second data switching device, the second data switching device functioning as a second Backbone Edge Bridge within the transport network, the second data switching device connected to a second access network;

in response to interpreting the first control message as signaling that the second data switching device is also functioning as a second PIM router, adding the second data switching device to a record that indicates Backbone Edge Bridges within the transport network having PIM adjacency with the first data switching device;

receiving a PIM Join control message at the first data switching device from the first access network; and encapsulating the PIM Join control message using Mac-in-Mac encapsulation and transmitting the PIM Join control message towards a PIM rendezvous point RP via the transport network.

2. The computer-implemented method of claim 1, wherein interpreting the first control message as signaling that the second data switching device is also functioning as a second PIM router is in response to identifying that the first control message is an Intermediate System To Intermediate System (IS-IS) control message having a null type-length-value (TLV).

3. The computer-implemented method of claim 2, wherein the TLV indicates a TLV type as IS-IS Internet Protocol Multicast TLV control message.

4. The computer-implemented method of claim 1, wherein adding the second data switching device to a record that indicates Backbone Edge Bridges within the transport network having PIM adjacency with the first data switching device includes maintaining the Backbone Edge Bridges in the record as adjacent PIM routers without receiving PIM Hello messages.

5. The computer-implemented method of claim 1, wherein receiving the first control message from the second data switching device includes the second data switching device being two or more hops away from the first data switching device in the transport network.

6. The computer-implemented method of claim 1, wherein the second data switching device connected to a second access network includes the second access network belonging to a same Internet Protocol multicast domain as the first access network.

7. The computer-implemented method of claim 1, further comprising:
generating a second control message signaling that the first data switching device is the first PIM router; and
transmitting the second control message to Backbone Edge Bridges within the transport network.

8. The computer-implemented method of claim 7, wherein generating the second control message includes generating a null Intermediate System To Intermediate System (IS-IS) type-length-value (TLV) control message.

9. A computer program product including a non-transitory computer-storage medium having instructions stored thereon for processing data information, such that the instructions, when carried out by a processing device, cause the processing device to perform the operations of:
receiving a first control message at a first data switching device, the first data switching device functioning as a first Backbone Edge Bridge within a transport network using Shortest Path Bridging protocol, the first data switching device also functioning as a first Protocol Independent Multicast (PIM) router, the first data switching device connected to a first access network, the first control message originating from a second data switching device, the second data switching device functioning as a second Backbone Edge Bridge within the transport network, the second data switching device connected to a second access network;
in response to interpreting the first control message as signaling that the second data switching device is also functioning as a second PIM router, adding the second data switching device to a record that indicates Backbone Edge Bridges within the transport network having PIM adjacency with the first data switching device;
receiving a PIM Join control message at the first data switching device from the first access network; and
encapsulating the PIM Join control message using Mac-in-Mac encapsulation and transmitting the PIM Join control message towards a PIM rendezvous point RP via the transport network.

10. The computer program product of claim 9, wherein interpreting the first control message as signaling that the second data switching device is also functioning as a second PIM router is in response to identifying that the first control message is an Intermediate System To Intermediate System (IS-IS) control message having a null type-length-value (TLV).

11. The computer program product of claim 10, wherein the TLV indicates a TLV type as IS-IS Internet Protocol Multicast TLV control message.

12. The computer program product of claim 9, wherein adding the second data switching device to a record that indicates Backbone Edge Bridges within the transport network having PIM adjacency with the first data switching device includes maintaining the Backbone Edge Bridges in the record as adjacent PIM routers without receiving PIM Hello messages.

13. The computer program product of claim 9, wherein receiving the first control message from the second data switching device includes the second data switching device being two or more hops away from the first data switching device in the transport network.

14. The computer program product of claim 9, wherein the second data switching device connected to a second access network includes the second access network belonging to a same Internet Protocol multicast domain as the first access network.

15. The computer program product of claim 9, having further instructions stored thereon for processing data information, such that the further instructions, when carried out by the processing device, cause the processing device to perform the operations of:
generating a second control message signaling that the first data switching device is the first PIM router; and
transmitting the second control message to Backbone Edge Bridges within the transport network.

16. The computer program product of claim 15, wherein generating the second control message includes generating a null Intermediate System To Intermediate System (IS-IS) type-length-value (TLV) control message.

17. A system for packet switching in a Shortest Path Bridging (SPB) network, the system comprising:
a processor; and
a memory coupled to the processor, the memory storing instructions that, when executed by the processor, cause the system to perform the operations of:
receiving a first control message at a first data switching device, the first data switching device functioning as a first Backbone Edge Bridge within a transport network using Shortest Path Bridging protocol, the first data switching device also functioning as a first Protocol Independent Multicast (PIM) router, the first data switching device connected to a first access network, the first control message originating from a second data switching device, the second data switching device functioning as a second Backbone Edge Bridge within the transport network, the second data switching device connected to a second access network;
in response to interpreting the first control message as signaling that the second data switching device is also functioning as a second PIM router, adding the second data switching device to a record that indicates Backbone Edge Bridges within the transport network having PIM adjacency with the first data switching device;
receiving a PIM Join control message at the first data switching device from the first access network; and
encapsulating the PIM Join control message using Mac-in-Mac encapsulation and transmitting the PIM Join control message towards a PIM rendezvous point RP via the transport network.

18. The system of claim 17, wherein interpreting the first control message as signaling that the second data switching device is also functioning as a second PIM router is in response to identifying that the first control message is an Intermediate System To Intermediate System (IS-IS) control message having a null type-length-value (TLV); and wherein adding the second data switching device to a record that indicates Backbone Edge Bridges within the transport network having PIM adjacency with the first data switching device includes maintaining the Backbone Edge Bridges in the record as adjacent PIM routers without receiving PIM Hello messages.

19. The system of claim 18, wherein receiving the first control message from the second data switching device includes the second data switching device being two or more hops away from the first data switching device in the transport network. access network.

20. The system of claim 17, the memory storing further instructions that, when executed by the processor, cause the system to perform the operations of:
generating a second control message signaling that the first data switching device is the first PIM router;
transmitting the second control message to Backbone Edge Bridges within the transport network; and
wherein generating the second control message includes generating a null Intermediate System To Intermediate System (IS-IS) type-length-value (TLV) control message.

* * * * *